Oct. 24, 1944.   R. NEBOLSINE   2,361,231
APPARATUS FOR ABSTRACTING STREAM WATER
Filed Jan. 13, 1943   5 Sheets-Sheet 2

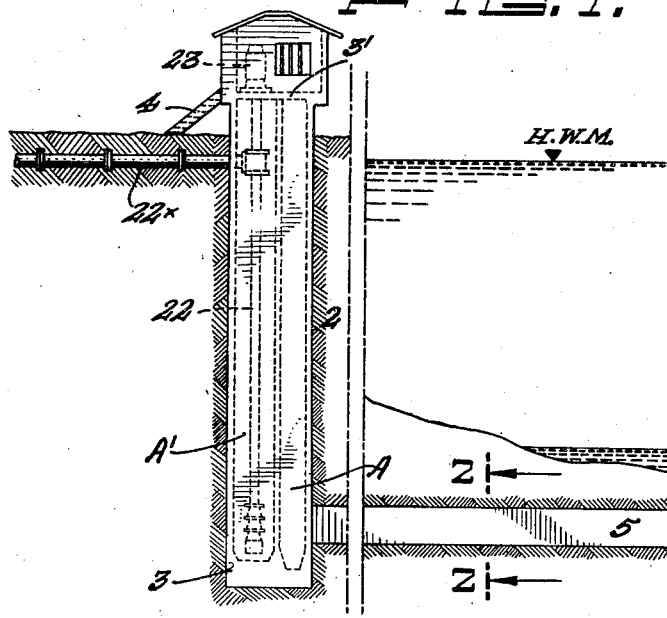
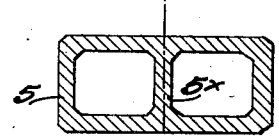
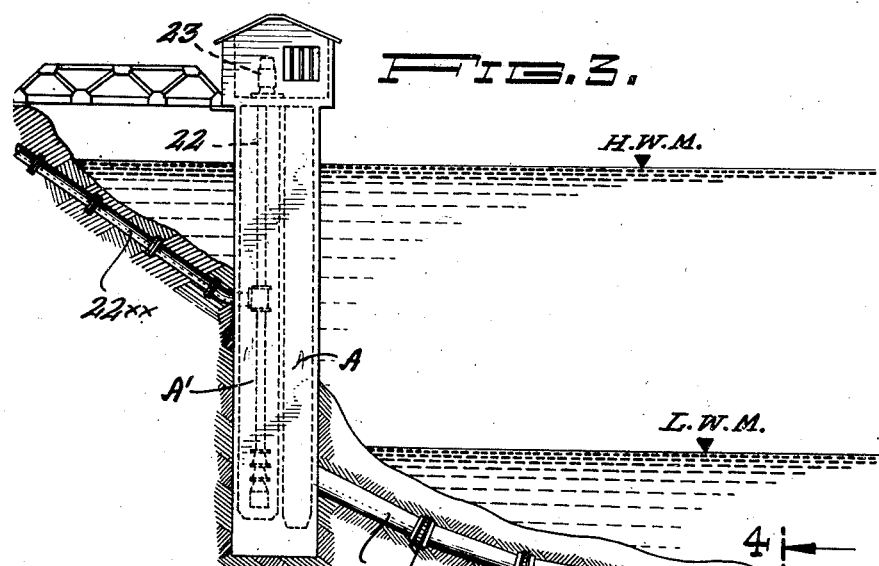
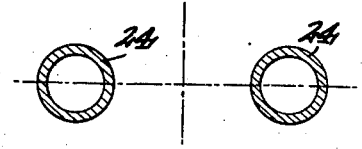

INVENTOR.
Ross Nebolsine
BY
ATTORNEY.

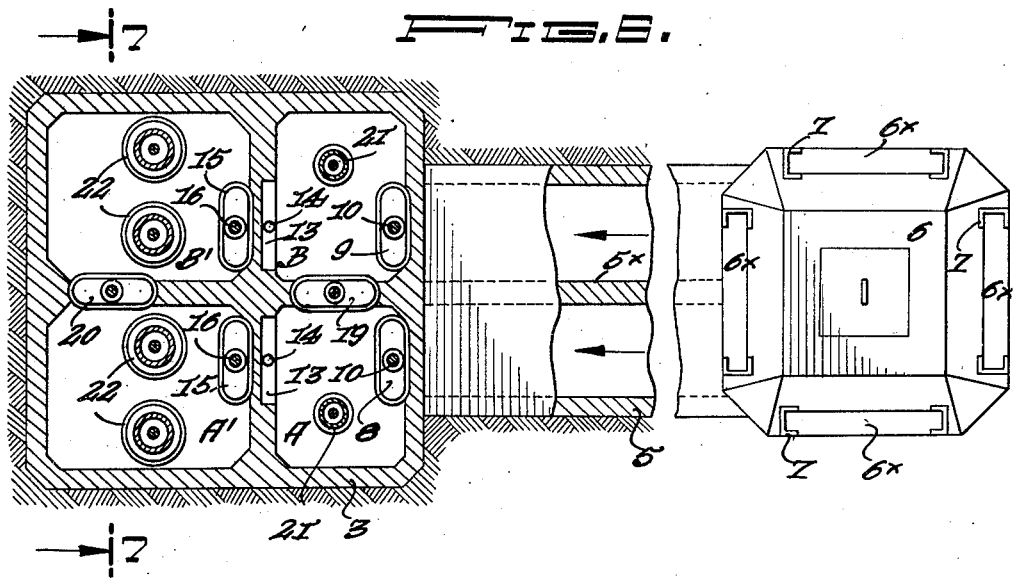

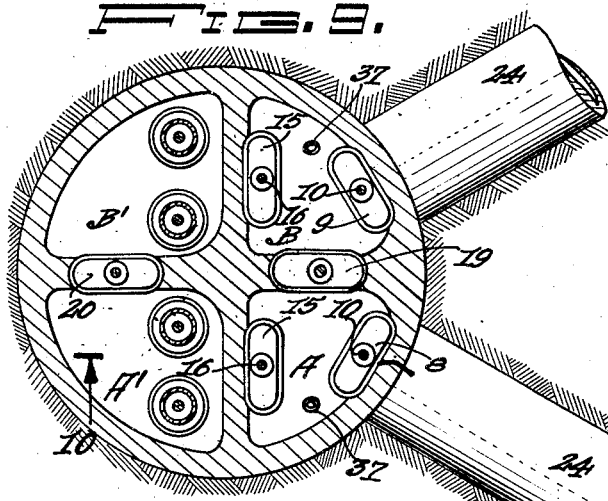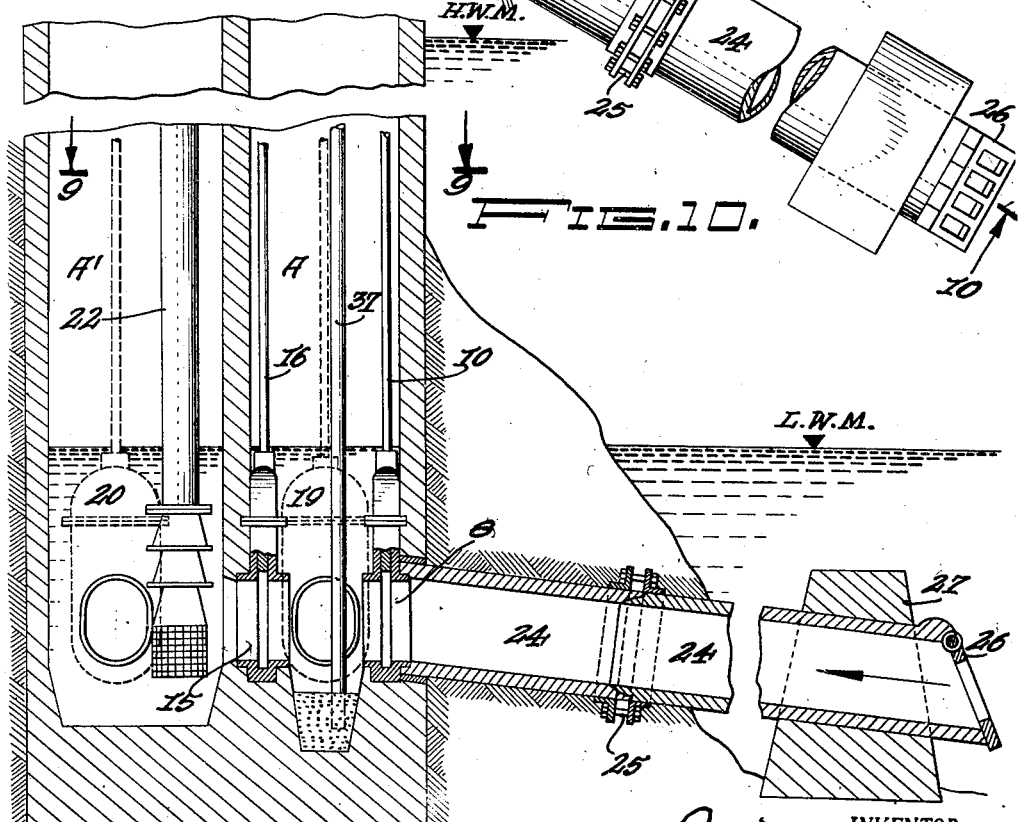

Oct. 24, 1944. R. NEBOLSINE 2,361,231
APPARATUS FOR ABSTRACTING STREAM WATER
Filed Jan. 13, 1943 5 Sheets-Sheet 5
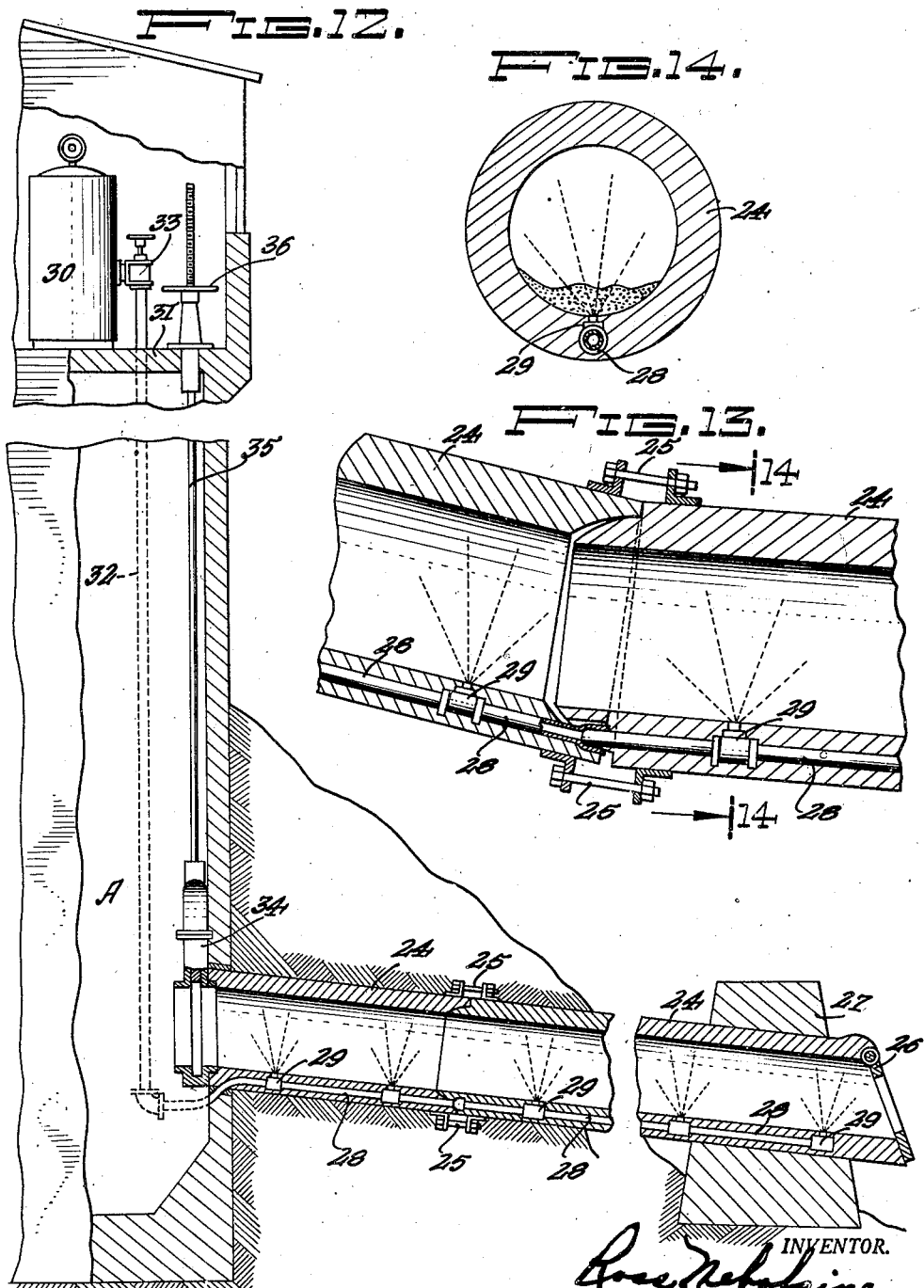

Patented Oct. 24, 1944

2,361,231

UNITED STATES PATENT OFFICE 2,361,231

APPARATUS FOR ABSTRACTING STREAM WATER

Ross Nebolsine, Seacliff, N. Y.

Application January 13, 1943, Serial No. 472,295

10 Claims. (Cl. 103—1)

The present invention relates to the collection of water from streams, and particularly from streams subject to great variations in level, so that the collected water may be pumped to points of need. The apparatus is in duplex arrangement which enables uninterrupted pumping irrespective of damage to or stoppage of any one part or section of the apparatus, and this duplex arrangement is effected in such manner as to require only slight increase in cost. Means are provided for settling out solid particles from the collected water and for preliminarily screening out floating materials or large suspended materials from the entering water. Also, means are provided for clearing out accumulated sediment from the intake conduits, and by fluid pressure, in such manner that the operation of the apparatus may be continued during cleaning operations which are applied to the whole of the intake conduits.

The invention will be described with reference to the accompanying drawings, in which:

Figure 1 is a schematic view in elevation, showing an embodiment of the apparatus applied to a stream bed and the adjacent bank, the figure being vertically broken away and the earth formation being shown in section.

Figure 2 is a vertical section on the line 2—2, Figure 1.

Figure 3 is a view in elevation similar to Figure 1, showing a modified form of the apparatus.

Figure 4 is a vertical section on the line 4—4, Figure 3.

Figure 6 is a horizontal section on the line 6—6, Figure 5.

Figure 7 is a vertical section on the line 7—7, Figure 6.

Figure 8 is a vertical section on the line 8—8, Figure 5.

Figure 9 is a horizontal section taken on the line 9—9, Figure 10 and relating to the structure of Figure 3.

Figure 10 is a vertical section on the line 10—10, Figure 9.

Figure 11 is a front elevation of the screening gate indicated in Figures 9 and 10.

Figure 12 is a schematic view in sectional elevation showing the application of fluid cleaning means for the intake conduits such as illustrated in Figures 9 and 10.

Figure 13 is an enlarged longitudinal section taken through the joining end portions of the conduit members of Figure 12.

Figure 14 is a transverse sectional elevation on the line 14—14, Figure 13.

Figure 5:
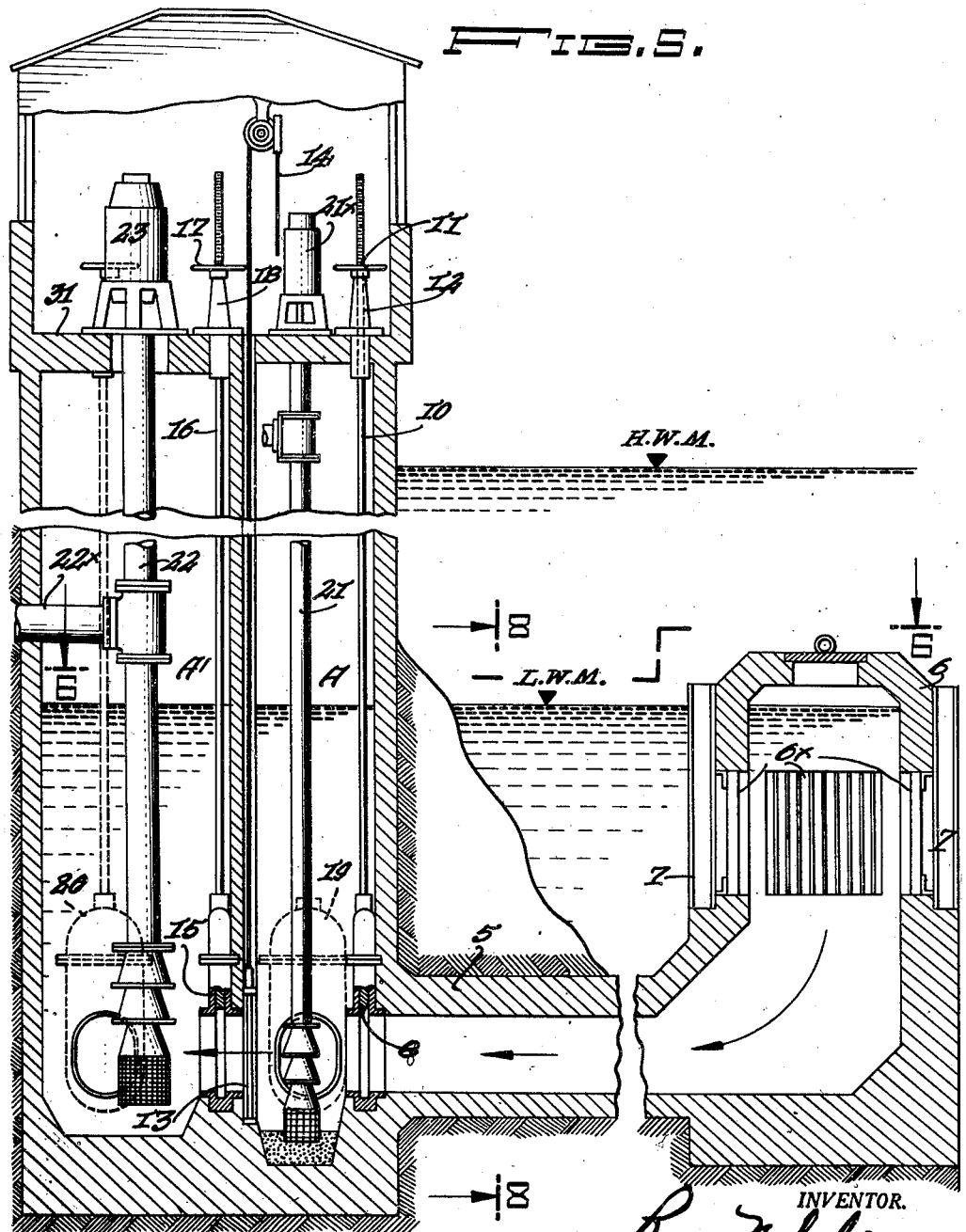
Figure 5 is an enlarged vertical section taken through the apparatus shown in Figure 1.

In Figure 1, I have illustrated a stream bed at 1 and the stream bank at 2. Within the bank adjacent the stream bed is a water collection tower 3 which preferably extends downwardly to a point at or near the bottom of the stream. This tower may be formed of concrete and it is preferably divided into four chambers as shown more particularly in Figures 6 and 7 wherein the chambers are indicated at A, A', B and B'. The tower is closed at its top and provided with a working platform 3' within a house-like structure to which access may be had by a stairway 4.

The chambers A and B are forebays, each of which is adapted to communicate with one-half section of the water intake conduit 5 which, in the embodiment illustrated, consists of a unitary concrete or similar culvert 5 having a longitudinally extending division wall 5x dividing the structure into two water intake passageways. The conduit 5 at its forward end leads to a screen box 6 having any desired number of intake screens 6x preferably protected by heavy vertical bars 7 so that heavy floating objects in the water will not injure the screen.

Referring to Figures 5, 6 and 7, it will be seen that the entrance between each passageway of the intake conduit and its appropriate forebay is controlled by a slide valve, that for forebay A being indicated at 8 in Figures 5 and 6 and the valve for forebay B being indicated at 9. Each valve slide is carried by a rod 10 leading upwardly above the working platform 3', the rod being threaded to receive an operating wheel 11 on a standard 12 so that rotation of the wheel will effect raising or lowering of the valve slide.

The chambers A' and B' are rearbays. Between forebay A and rearbay A' is a passageway controlled by two elements, the first being a screen 13 which may be raised or lowered from the working platform by means of a pulley and cable device 14 or be of some suitable automatic rotary type, the second element being a slide or gate valve indicated at 15, the slide of the valve being connected to a vertically extending rod 16 leading upwardly above the working platform 3' and threaded to receive an operating wheel 17 carried by standard 18 so that rotation of the wheel may raise and lower the valve slide.

Between forebay B and rearbay B' is a passageway controlled by the same arrangement of retractable revolving screens and slide or gate valves as just described, and, hence, the said elements are designated by the same reference characters in Figure 6.

I preferably afford communication between the two forebays and also between the two rearbays, the means in each case being a slide or gate valve, such valve being indicated at 19 for the forebays and 20 for the rearbays.

Within forebay A is a vertical turbine or other suitable type of pump indicated at 21. The term "pump" includes the pump column with its intake end, the latter being screened, and an outlet therefor, the driving mechanism for the pump being indicated at 21x above the working platform 3'. Also, within each of the rearbays A', B' will be housed one or a plurality of vertical turbines or other suitable pumps generally indicated at 22 which lead upwardly through the working platform 3' to motors or other operating mechanism indicated at 23, Figure 5.

The tower 3 may be rectangular, as shown in Figure 6, or circular as shown in Figure 9. In the modification as to intake conduit formation illustrated in Figure 3, and also in Figures 9, 10, and 12 to 14 inclusive, the conduit members consist of flexible jointed pipes which may be laid together in open trenches on the bottom of a stream following its contour to the point of intake. As shown in Figures 3, 9 and 10, the sections of the pipe may be connected by flexible or adjustable joints and the pipe sections, indicated at 24, may be bolted together as shown at 25. In the form illustrated in the Figures 13 and 14, one end of each pipe is formed with a reduced bevelled projection to rock within a socket of corresponding formation at the end of a contiguous pipe section so that the pipe sections may conform to irregularities of the stream bottom. The intake may consist of a simple form of slotted hinged cover which will permit the ejection of solid particles but which will bar entrance of larger objects. The hinged cover bears the numeral 26 and the rearmost pipe section may be anchored by a block of concrete 27 or other suitable means to hold the intake securely to the stream bottom.

Because, under certain conditions, the type of intake just described may admit a considerable amount of sedimentary material, provision is made for removal of the same, which consists of fluid pressure pipes 28 (Figures 13 and 14) carried by the flexible jointed pipe sections, these fluid pressure pipes having discharge orifices or nozzles communicating with the interior of the pipe sections and leading to a source of air or other fluid pressure, as, for example, the pressure pipe 30 disposed above the working platform 3', the connection being by means of a lead-in pipe 32 controlled by a valve 33. Thus by discharging air into the base portions of the flexible jointed pipe conduits or tunnel, the sediment accumulating in the latter will be lifted and shot out with force through the pipe conduits back into the stream, because in the action of the air jets a valve 34 controlling the passageway between the appropriate pipe conduit and its appropriate forebay will be closed, as by operation of the valve lift rod 35 by wheel 36 in the same manner as previously described with reference to the forebay valves 8 and 9 of Figure 6.

In some cases the screens 13 intermediate the forebays and rearbays may be eliminated and hence they are not shown in the structure illustrated in Figures 9 and 10. Also the pumps 21 employed in the forebays of the structure illustrated in Figures 6 and 7 may be eliminated and a sediment withdrawal pipe substituted for each forebay as indicated at 37, Figures 9 and 10.

In the structure shown in Figures 1, 5 and the corresponding view, each rearbay pump may have a horizontal discharge pipe outlet 22x which may be laid in a trench near the surface of the bank adjoining the stream bed; and in the embodiment illustrated in Figure 3, the discharge pipe outlet 22xx may be laid along the upward curve of the stream bed or bank beginning at a point below the high water mark.

In the operation of my apparatus, water may be collected in both of the forebays, and when the water in the stream contains little sediment and the demand for water is substantial, all of the pumps may be put into operation for water withdrawal, in which case the valves 8, 9 and 15 will be open. Should it be necessary to shut down either of the forebays A or B, as for repair or cleaning of any appurtenances, this may be done upon closing the appropriate valves, whereupon the second forebay may continue to convey water to one or both of the collecting rearbays and their pumps. Should it be necessary to shut down either rearbay, that may be done by closing its valves without affecting the continued water collection. It will be noted that pumps in the forebays are provided with independent discharges.

When sedimentation is a serious factor, as during high water levels, the forebays may be alternately opened to communication with both rearbays, or to one of them. Thus during pumping of water from one forebay, the second forebay may be employed to effect settlement of sedimentation in the water therein, and, if necessary, pressure removal of sediment from the entire intake structure through use of the air blast pipe 37, with or without use of an appropriate pump 21, 21x. In such case, when the said pump is used, its discharge will be directed exterior the water collection line.

By culvert is meant tunnel, pipe, any sort of conduit.

Having described my invention, what I claim and desire to secure by Letters Patent, is as follows:

1. In apparatus for abstracting stream water, a tower having inner division walls providing a forebay area and two rearbay areas, the said tower being disposed at a side of a stream, an intake conduit leading from the tower to a bed area of the stream, valve means controlling communication between the intake conduit and the forebay area of the tower, and means for selectively opening and closing communication between either rearbay area and the forebay area.

2. In apparatus for abstracting stream water, a tower having inner division walls providing a forebay area and two rearbay areas, the said tower being disposed at a side of a stream, an intake conduit leading from the tower to a bed area of the stream, valve means controlling communication between the intake conduit and the forebay area of the tower, pumping means in each of the rearbay areas and adapted to raise water therein to a point above the water level of the stream, outlet means for each rearbay area, and means for selectively opening and closing communication between either rearbay area and the forebay area.

3. In apparatus for abstracting stream water, a tower having inner division walls providing a plurality of forebay areas and a plurality of rearbay areas, the said tower being disposed at a side of a stream, means providing independent water passageways leading from the stream to the forebay areas so that an independent supply of water may be led to each forebay area, valve means controlling communication between each passageway and one of the rearbay areas, pumping means in each of the rearbay areas and acting upon water therein, and outlet means for each rearbay area.

4. In apparatus for abstracting stream water, a tower having inner division walls providing a plurality of forebay areas and a plurality of rearbay areas, a water intake conduit leading from the base of the tower to a bed area of the stream, the said conduit being longitudinally divided into two passageways, each leading to one forebay area, screens controlling passageways between the forebay and rearbay areas, a working platform in the intake tower at the upper area thereof, valves controlling said last-named passageways, means on said working platform for operating said valves, one independently of the other, and providing means for access to said screens, pumping means in each of the rearbay areas and acting upon water therein, and means on the working platform for controlling said pumping means.

5. Apparatus for extracting stream water constructed in accordance with claim 3, in combination with pumping means in each forebay area.

6. Apparatus constructed in accordance with claim 3, in combination with valve means controlling communication between the rearbays.

7. In apparatus for abstracting stream water, a tower disposed at the side of a stream and rising above the high water mark of the stream, the tower having in an upper area a working platform and being provided with longitudinally extending cruciform walls dividing the tower into two forebays and two rearbays, valves controlling communication between each forebay and one of the rearbays and a valve controlling communication between the rearbays, means on the working platform for operating said valves, pumping means in the rearbays and adapted to raise water therein, said pumping means being controlled from said working platform, and means providing independent water passageways leading from the stream to the forebay areas so that an independent supply of water may be led to each forebay area.

8. Apparatus for abstracting stream water constructed in accordance with claim 2, in combination with means for injecting fluid under pressure at spaced points within the intake conduit from the base area thereof to discharge accumulated sediment.

9. Apparatus for abstracting stream water constructed in accordance with claim 2, in which the intake conduit consists of a plurality of pre-cast sections, means for connecting the sections so that the latter may lie with irregularity to conform with a stream bed, and a longitudinally extending pipe cast in the base of each conduit section and provided with spaced injection nozzles communicating with the interior of the conduit section, the ends of the pipes projecting outwardly and being formed for interfitting relationship, and means for supplying fluid under pressure to the said pipes in the conduit sections.

10. Apparatus for abstracting stream water constructed in accordance with claim 2, in combination with an intake box for the intake conduit, the box being a structure mounted on the stream bed and formed with a plurality of intake openings, a screen at each intake opening, and guard means for each screen.

ROSS NEBOLSINE.